(12) United States Patent
Riguer et al.

(10) Patent No.: US 10,747,553 B2
(45) Date of Patent: *Aug. 18, 2020

(54) SHADER PIPELINES AND HIERARCHICAL SHADER RESOURCES

(71) Applicants: Advanced Micro Devices, Inc., Santa Clara, CA (US); ATI Technologies ULC, Markham (CA)

(72) Inventors: Guennadi Riguer, Thornhill (CA); Brian K. Bennett, Northborough, MA (US)

(73) Assignees: Advanced Micro Devices, Inc., Santa Clara, CA (US); ATI Technologies ULC, Markham, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/167,162

(22) Filed: Oct. 22, 2018

(65) Prior Publication Data

US 2019/0056958 A1 Feb. 21, 2019

Related U.S. Application Data

(63) Continuation of application No. 14/560,685, filed on Dec. 4, 2014, now Pat. No. 10,108,439.

(51) Int. Cl.
G06F 9/448 (2018.01)
G06T 15/00 (2011.01)
G09G 5/36 (2006.01)

(52) U.S. Cl.
CPC ............ G06F 9/449 (2018.02); G06T 15/005 (2013.01); *G09G 5/363* (2013.01)

(58) Field of Classification Search
None
See application file for complete search history.

(56) References Cited

U.S. PATENT DOCUMENTS

| | | |
|---|---|---|
| 2011/0087864 A1 | 4/2011 | Dulak, Jr. et al. |
| 2014/0118375 A1 | 5/2014 | Abdalla et al. |
| 2014/0347371 A1 | 11/2014 | Stenson et al. |
| 2014/0354658 A1 | 12/2014 | Dotsenko et al. |
| 2015/0269767 A1 | 9/2015 | Patel et al. |

*Primary Examiner* — Yingchun He
(74) *Attorney, Agent, or Firm* — Volpe and Koenig, P.C.

(57) ABSTRACT

Shader resources may be specified for input to a shader using a hierarchical data structure which may be referred to as a descriptor set. The descriptor set may be bound to a bind point of the shader and may contain slots with pointers to memory containing shader resources. The shader may reference a particular slot of the descriptor set using an offset, and may change shader resources by referencing a different slot of the descriptor set or by binding or rebinding a new descriptor set. A graphics pipeline may be specified by creating a pipeline object which specifies a shader and a rendering context object, and linking the pipeline object. Part or all of the pipeline may be validated, cross-validated, or optimized during linking.

22 Claims, 9 Drawing Sheets

SHADER PIPELINES AND HIERARCHICAL SHADER RESOURCES

CROSS REFERENCE TO RELATED APPLICATION

This application is a continuation of U.S. patent application Ser. No. 14/560,685, filed Dec. 4, 2014, issuing as U.S. Pat. No. 10,108,439 on Oct. 23, 2018, the entire contents of which are hereby incorporated by reference as if fully set forth herein.

FIELD OF INVENTION

The present invention relates to shader pipelines and shader resources.

BACKGROUND

A shader may be a computer program used to perform operations on geometry data, other computer graphics data, or other types of data. Shaders are typically executed by a graphics processing unit (GPU) as part of a graphics or rendering pipeline, and may operate on data inputs which may be referred to as shader resources. Shader resources may include buffers, textures, images, or other kinds of data. A program executing on a central processing unit (CPU) may store a shader resource in a memory location (which may be dedicated) for use by a GPU.

A graphics or rendering pipeline may be conceptualized as a group of state operations performed on data to render an image or other data. Generally, a pipeline may be implemented using modules including programmable shaders and/or fixed function units. The pipeline may be mapped onto specialized computing hardware, such as a GPU, to perform operations such as rendering on graphics data or other data.

SUMMARY OF EMBODIMENTS

Some embodiments provide a method for specifying a shader resource. A data structure is created having at least one slot which contains a pointer to the shader resource. The data structure is bound to a bind point of a shader. At least one slot is referenced by an offset to input the shader resource to the shader.

Some embodiments provide a method for specifying a resource. A data structure is created having at least one slot which contains a pointer to the resource or other resource metadata. The data structure is bound to a bind point of a pipeline. Each slot is referenced by an offset.

Some embodiments provide a method for specifying a graphics pipeline. A pipeline object is created. At least one shader object is attached to the pipeline object which specifies at least one shader. At least one rendering context object is attached to the pipeline object which specifies at least part of a rendering context.

BRIEF DESCRIPTION OF THE DRAWINGS

A more detailed understanding may be had from the following description, given by way of example in conjunction with the accompanying drawings wherein.

DETAILED DESCRIPTION OF THE PREFERRED EMBODIMENTS

Figure 1:
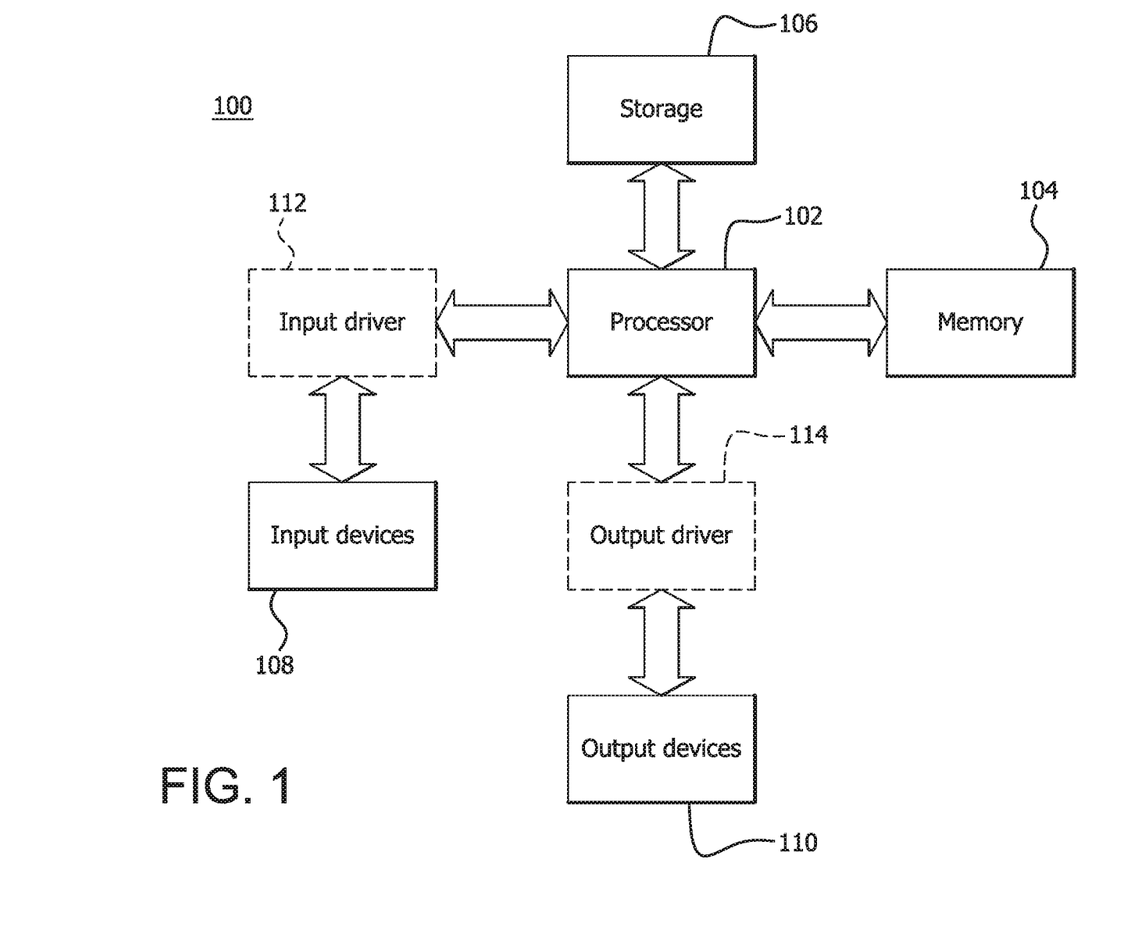
FIG. 1 is a block diagram of an example device in which one or more disclosed embodiments may be implemented.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die (sometimes referred to as an APU), or one or more processor cores, wherein each processor core may be a CPU or a GPU and the cores do not have to be the same type nor have the same capabilities. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. Such storage 106 may store applications which may reference or include shader programs. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

A shader may be a computer program used to perform operations on geometry data, other computer graphics data, or other types of data. Shaders are typically executed by a GPU as part of a graphics or rendering pipeline, and may operate on data inputs which may be referred to as shader resources. Such shaders may form part of an application which is stored locally in, for example, storage 106 or may be downloaded or streamed via an input device 108.

Shader resources may include buffers, textures, images, or other kinds of data. A program executing on a CPU may store a shader resource in a memory location dedicated for use by a GPU. Such memory is referred to herein as GPU memory. It is noted that GPU memory may be located on or off of the GPU itself, on or off of a graphics card or daughterboard incorporating the GPU, in a portion of CPU memory or main memory, or in another location depending upon the desired implementation. It is noted that although reference is made to computer graphics processing applications herein, shaders and GPUs may also be used for processing non-graphics data in some cases, and this field may be referred to as general purpose programming on graphics processing units (GPGPU).

Shader resources may be accessed by shaders according to one of several approaches; including a slot-based approach, a "bindless" approach, and a descriptor set approach.

In a slot-based approach to shader resource access, a shader may be configured to input shader resources that are bound to shader resource slots. A limited number of shader resource slots may be available per-shader and/or per-resource type. Shader resource slots may be considered part of the GPU state and may include registers of the GPU dedicated for use as bind points for GPU memory containing or pointing to shader resources and containing resource metadata. Alternatively, the shader resource slots might be backed by GPU memory.

A shader may access shader resources that are part of the current GPU state by explicitly referencing them through a shader resource slot by slot number, possibly using an offset. In the slot-based approach, shader resources may only access shader resources constituting the current GPU state by reference to resource slots, and if it is desired to input a new resource to a shader, one of the resource slots may be required to be bound to GPU memory containing or pointing to the new resource.

If it is desired to input a plurality of shader resources to the shader, a separate resource slot may be required to be set, pointing to each resource. If it is no longer desired to input a particular resource to a shader, or if it is desired to replace a particular resource, the resource slot may be required to be unbound from the GPU memory containing or pointing to that resource to free the slot to be bound to a different resource. Binding, unbinding, and rebinding shader resource memory locations to the resource slots may be performed by a graphics API (which may form part of an operating system being executed by device 100) interfacing the GPU with a client application running on the CPU, and may result in load on the CPU which may be referred to as CPU overhead.

Figure 2:
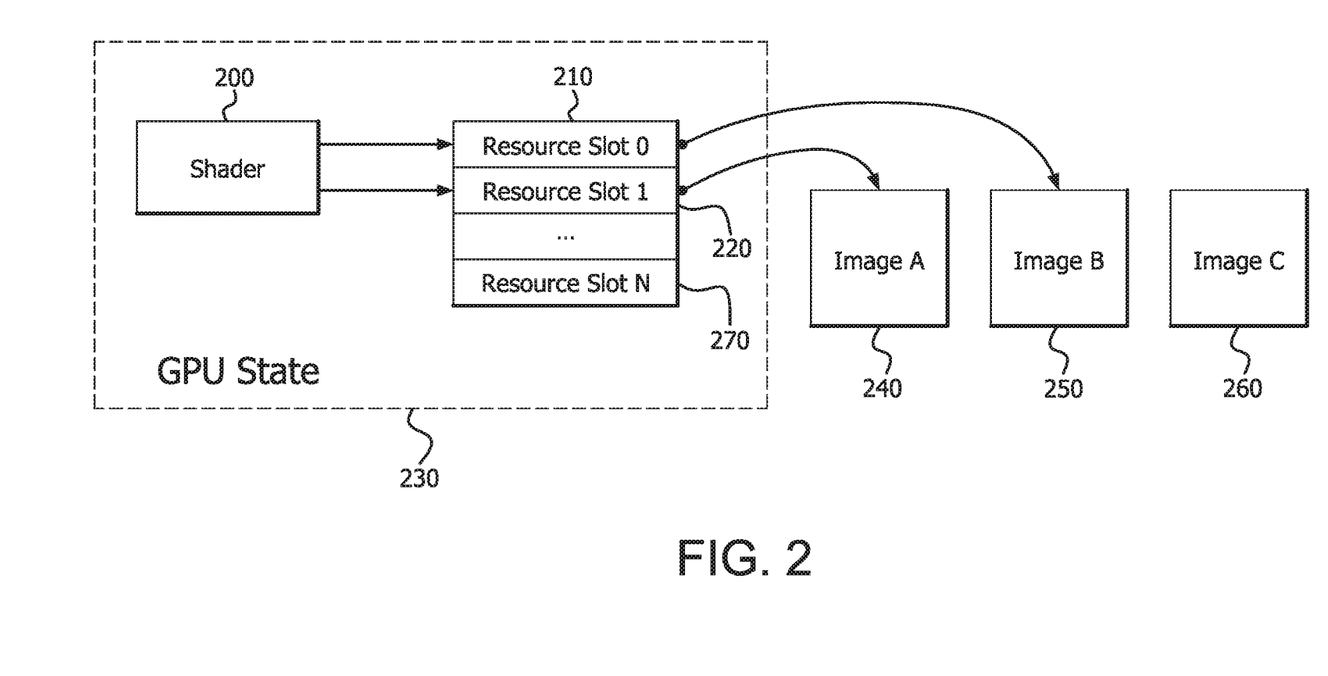
FIG. 2 is a block diagram illustrating an example slot-based approach to shader resource access.

FIG. 2 is a block diagram illustrating an example slot-based approach to shader resource access. A shader 200 references resource slots 210 and 220, which are a part of the GPU state 230. Resources 240 and 250, which are images in this example, are bound to resource slots 210 and 220 such that GPU memory containing resources 240 and 250 is pointed to by resource slots 220 and 210 respectively. A third resource 260 is shown as not bound to a resource slot. However, if it were desired to input resource 260 to shader 200, GPU memory containing resource 260 could be bound to a free resource slot such as resource slot 270. Alternately, resource slot 210 could be unbound from GPU memory containing resource 250 for example, and subsequently bound to GPU memory containing resource 260.

Figure 3:
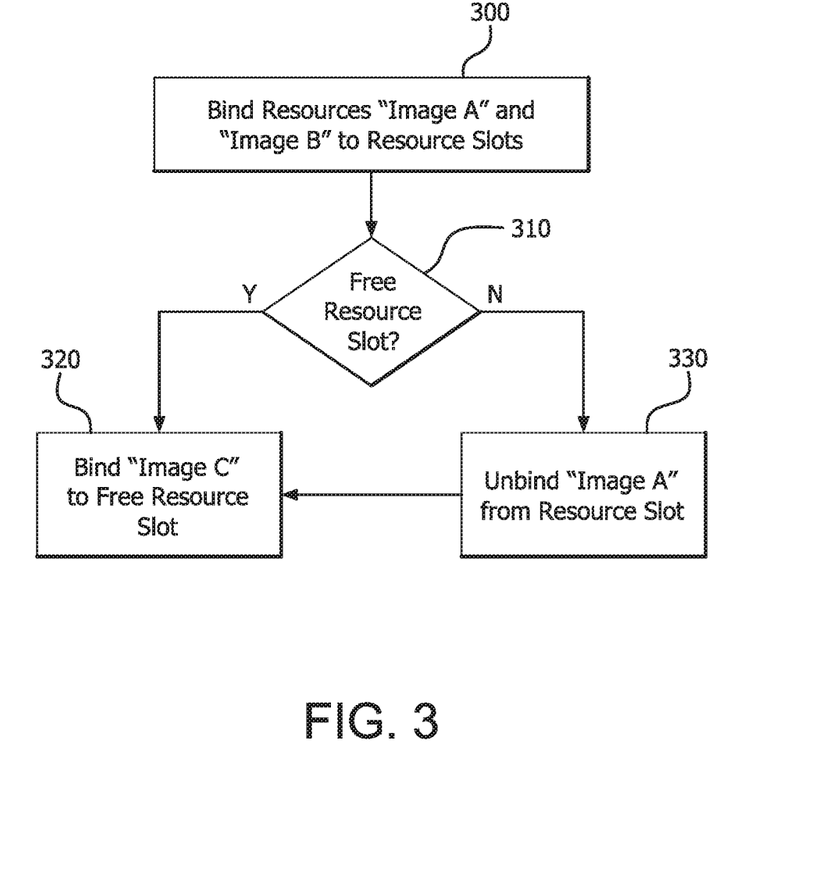
FIG. 3 is a flow chart illustrating the example slot-based approach to shader resource access described with respect to FIG. 2.

FIG. 3 is a flow chart illustrating the example slot-based approach to shader resource access described with respect to FIG. 2. In step 300, the resources "image A" and "image B" are bound to resource slots, which point to the GPU memory containing "image A" and "image B." On a condition that there is a free resource slot (step 310), a resource—"image C"—may be bound to the free resource slot for input to the shader in step 320. Otherwise, "image A" may be unbound from its resource slot (step 330), and "image C" may be bound to the free image slot created by unbinding "image A" in step 320.

In a "bindless" approach to shader resource access, shaders may not be constrained to accessing shader resources bound to specific resource slots, but may input shader resources having handles or other identifiers that are globally visible. Globally visible handles or pointers may be stored in a globally visible directory and point to GPU memory locations containing or pointing to the shader resources. A shader resource can be input to a shader by referring to its global handle.

A shader may thus access the shader resource by searching a globally visible directory by shader resource handle. Alternatively, a shader instance compiled with an embedded pointer to the shader resource may reference the shader resource memory location directly.

Thus if it is desired to input a shader resource to a shader, either the global directory must be searched by resource handle for a pointer to GPU memory containing the new shader resource, or a shader instance having an embedded pointer to the shader resource must be used. If it is desired to input a new plurality of shader resources to the shader, the directory must be searched by resource handle for each of the plurality of shader resources or a shader instance must be used in which a pointer to each of the shader resources is embedded. Managing shader resources by searching global directories may be performed by the shader, and this may result in load on the GPU which may be referred to as GPU overhead. Changing shader instances containing embedded pointers to shader references for each change in shader resources may be performed by the CPU and may also result in CPU overhead.

Figure 4:
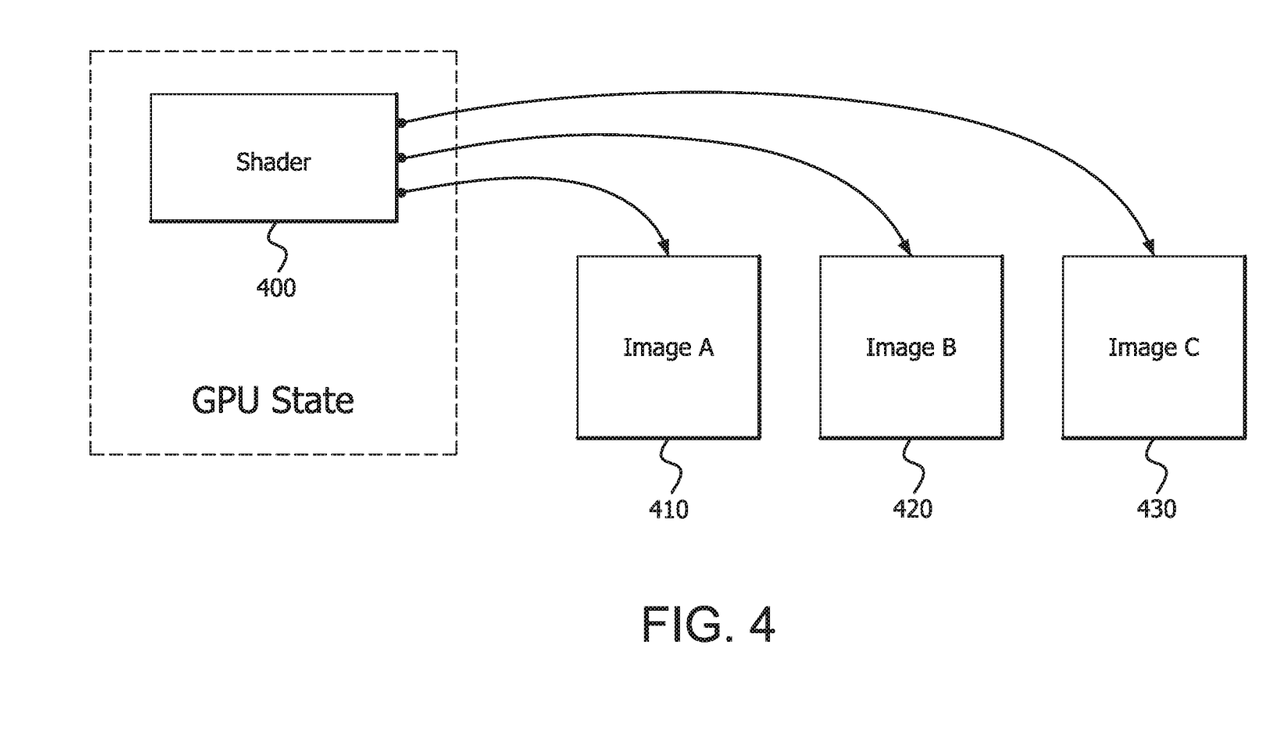
FIG. 4 is a block diagram illustrating an example bindless approach to shader resource access.

FIG. 4 is a block diagram illustrating an example bindless approach to shader resource access. A shader 400 references resources 410, 420, and 430 by searching a globally visible directory (not shown) by handle or by referencing embedded pointers as discussed above.

Figure 5:
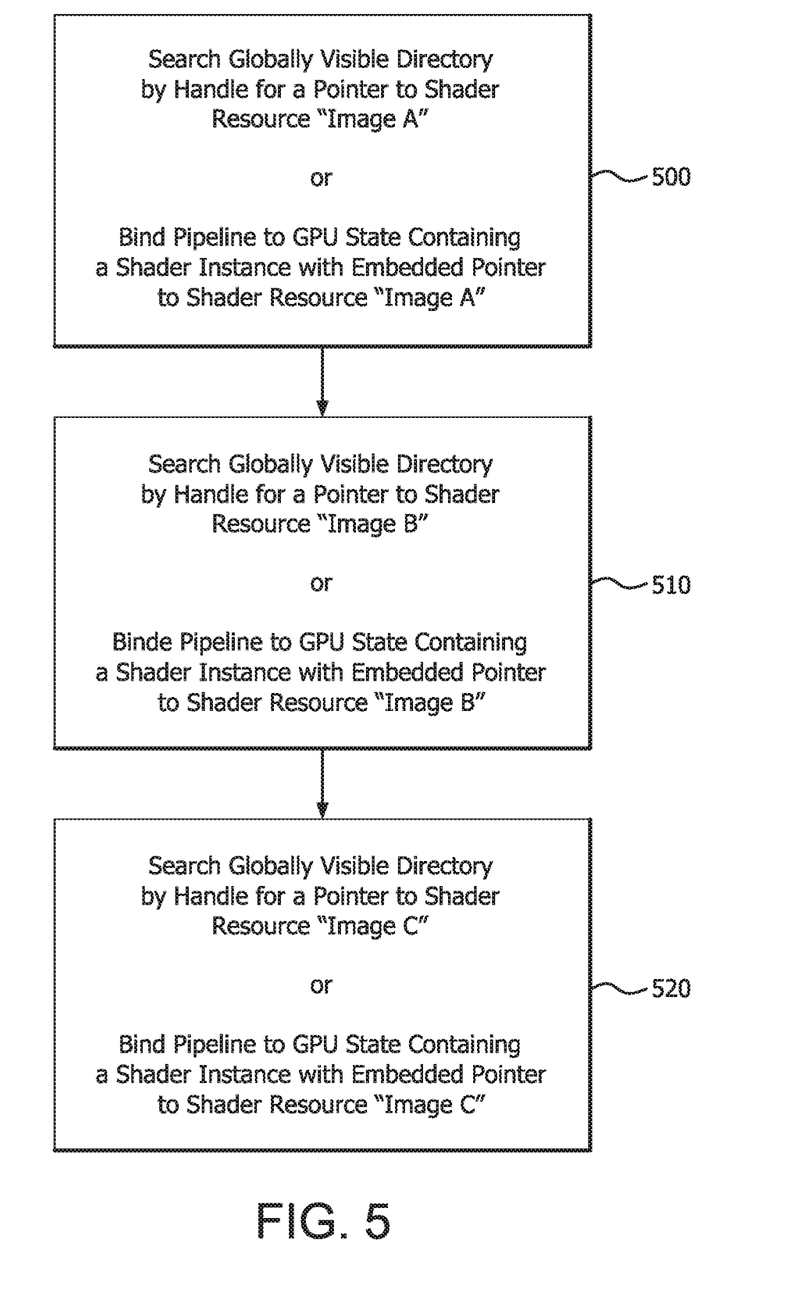
FIG. 5 is a flow chart illustrating the example bindless approach to shader resource access described with respect to FIG. 4.

FIG. 5 is a flow chart illustrating the example bindless approach to shader resource access described with respect to FIG. 4. In step 500 the shader searches a globally visible directory by handle for a pointer to shader resource "image A" or binds a pipeline to the GPU state containing a shader instance having an embedded pointer to shader resource "image A," depending upon implementation. This procedure is repeated in step 510 for shader resource "image B" and in step 520 for shader resource "image C."

In a descriptor set approach to shader resource access, shaders may input shader resources that are stored in GPU memory bound to hierarchical data structures called descriptor sets. A descriptor set may be stored in GPU memory, and may be bound to the GPU state using a descriptor set bind point. A descriptor set bind point may be considered part of the GPU state and may include a register of the GPU which may be designated for binding descriptor sets. A shader configured to input shader resources using descriptor sets may refer to one or more descriptor set bind points, and may input shader resources that are stored in or pointed to by GPU memory pointed to by a descriptor set bound to a bind point.

A descriptor set may contain one or more descriptor set slots. Each descriptor set slot may contain a pointer to memory containing a shader resource and its metadata, a pointer to another descriptor set, including the slot offset within the descriptor set. A pointer to a descriptor set may include a pointer to the same descriptor set. Thus a descriptor set may be nested or self-referencing if desired. A descriptor set may also be referenced with an offset, such that a shader referring to a descriptor set using an offset may input a shader resource indicated by a particular slot starting at the specified offset within the descriptor set.

Thus if it is desired to input a shader resource to the shader, a descriptor set bind point may be bound to a descriptor set pointing to the new shader resource, optionally including an offset to specify a descriptor set slot of the descriptor set. If it is desired to input a plurality of shader resources to the shader, a descriptor set bind point may be bound to a descriptor set which points to each resource in the plurality, optionally including one or more offsets to specify each of the descriptor set slots, an initial descriptor set slot of a series of consecutive slots, or endpoints of a range of descriptor set slots.

Unlike the slot-based model, a plurality of shader resources may be specified for input to the shader by binding a single descriptor set bind point whereas in the slot based model a separate resource slot may need to be bound to GPU memory for each of the plurality of shader resources. In some circumstances, this may have the advantage of reducing CPU overhead as compared to the slot-based approach. On the other hand, it may also be possible to bind a separate descriptor bind point to a different descriptor set each containing one of the plurality of new shader resources, which may provide implementation flexibility.

Furthermore, if it is desired to replace a particular shader resource or resources, the shader may reference a different slot or slots of the original descriptor set. The different slot or slots within the original descriptor set may be referenced by specifying a different offset or offsets for the descriptor set without changing binding to the bind point. Alternatively, the descriptor set bind point may be unbound from the descriptor set and re-bound to a different descriptor set containing the new shader resource or resources depending upon whether the new shader resource or resources are within the original descriptor set or a different descriptor set.

Rebinding a resource in a descriptor set may create CPU overhead. Referencing nested slots within the descriptor set hierarchy may create GPU overhead. Thus it is noted that it may be possible to build descriptor sets which specify shader resources in a way which enables CPU overhead and GPU overhead to be managed, balanced, or optimized as compared to slot-based and bindless approaches.

Figure 6:
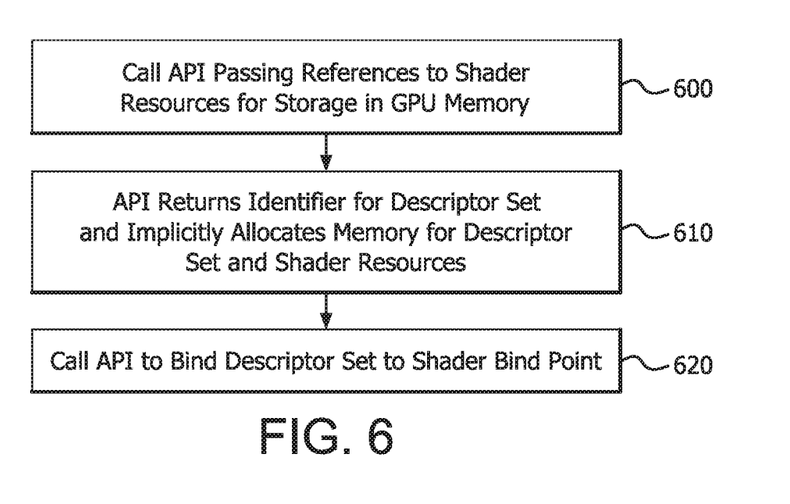
FIG. 6 is a flow chart illustrating a method of creating a descriptor set containing shader resources where memory is allocated implicitly by an API.

FIG. 6 is a flow chart illustrating a method of creating a descriptor set containing references to shader resources where memory is allocated implicitly by an API. A descriptor set may be created by a program (e.g., an end user application such as a game, CAD application, etc.) executing on a CPU using an application programming interface (API) in step 600. For example, the program may call a function of a library implementing the API, passing references to shader resources for storage in GPU memory. In response, the API may return an identifier for a descriptor set having descriptor set slots pointing to GPU memory locations where the shader resources are stored in step 610. Subsequently, the program executing on the CPU may bind the descriptor set to a descriptor set bind point of a shader using another API call in step 620. Thereafter the relevant shader may input the shader resource by referring to the appropriate descriptor set bind point.

Figure 7:
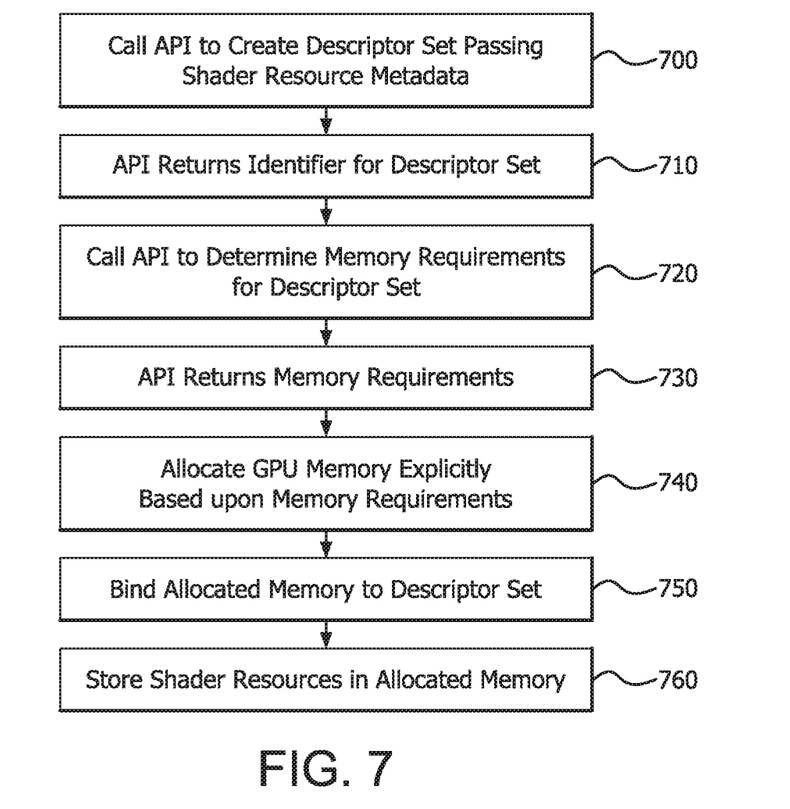
FIG. 7 is a flow chart illustrating a method of creating a descriptor set containing shader resources where memory is allocated explicitly by the API client.

FIG. 7 is a flow chart illustrating a method of creating a descriptor set containing references to shader resources where memory is allocated explicitly by the API client. The program (i.e., the API client) may call a function of the library without passing references to shader resources, but instead passing shader resource metadata in step 700. In response, the API may return an identifier for a descriptor set in step 710. Subsequently, the program may call the API to determine memory requirements for the descriptor set in step 720, which the API may return in step 730. The program may allocate GPU memory explicitly based upon the memory requirements in step 740, and may bind this memory to the descriptor set in step 750. Thereafter, the program may store a pointer to or handle of the shader resources in the allocated GPU memory in step 760.

The following pseudocode illustrates example creation and binding of a descriptor set.
  DESCRIPTOR_SET_CREATE_INFO descriptorInfo;
  descriptorInfo.slots=100;
  DESCRIPTOR_SET descSet;
  //Create descriptor set
  CreateDescriptorSet(device, &descriptorInfo, &descSet);
  //Attach resources to descriptor set
  BeginDescriptorSetUpdate(descSet);
  AttachImageViewDescriptors(descSet, offset0, imageA);
  AttachImageViewDescriptors(descSet, offset1, imageB);
  EndDescriptorSetUpdate(descSet);

Here, the program calls an API using CreateDescriptorSet( ) to create a descriptor set "descSet." In this example, the API call passes the identity of a GPU or its context "device," the desired number of slots "descriptorInfo" and storage "descSet" for a name or handle for the descriptor set. Thereafter, two shader resources "imageA" and "imageB" (or pointers to these resources) are attached to the descriptor set "descSet" in different descriptor set slots located at offsets specified by "offset0" and "offset1" respectively using the BeginDescriptorSetUpdate( ) AttachImageViewDescriptors( ) and EndDescriptorSetUpdate( ).

Thus, descriptor sets may be "pre-built" by storing shader resource data in memory for later binding to GPU state for a shader (i.e., a descriptor set bind point). In some circumstances this may facilitate modularity and reusability of shader resource sets in addition to potentially reducing CPU overhead as compared to slot-based and bindless approaches.

It is noted that descriptor sets may be created and used for purposes other than shader resources. For example, a descriptor set may include parameters for fixed function blocks, descriptors for render targets, and other information usable by a GPU pipeline.

Figure 8:
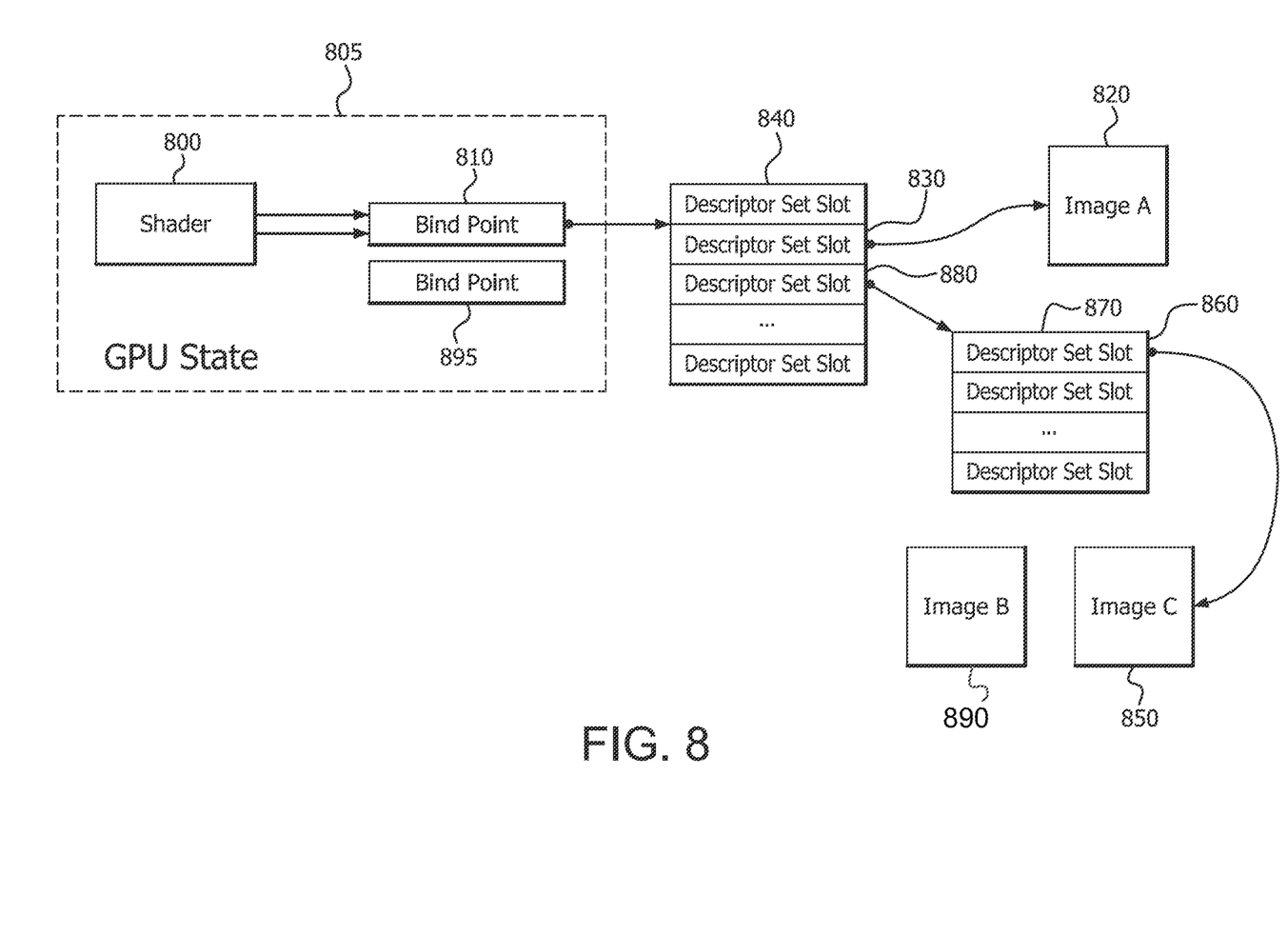
FIG. 8 is a block diagram illustrating a descriptor set based approach to shader resource access.

FIG. 8 is a block diagram illustrating a descriptor set based approach to shader resource access. A shader 800 references descriptor set bind point 810, which is a part of GPU state 805. Shader resource 820, which is an image in this example, is pointed to by a descriptor set slot 830 of descriptor set 840, which is bound to bind point 810. Shader resource 850, which is also an image, is pointed to by a descriptor set slot 860 of descriptor set 870, which is pointed to by descriptor slot 880 of descriptor set 840, which is bound to bind point 810. A third resource 890 is shown as not bound to a bind point or pointed to by a descriptor set. However, if it were desired to input resource 890 to shader 800, a pointer to GPU memory containing resource 890 could be added to descriptor set 840 or 870, or to another descriptor set (not shown) which could then be bound to bind point 895. The new descriptor set could also be bound to bind point 810 after unbinding descriptor set 840. It is noted that descriptor sets 840 and 870 may be pre-built and bound to resource bind points as needed.

A graphics or rendering pipeline may be conceptualized as a group of state operations performed on data to render an image. Generally, a pipeline may be implemented using modules including programmable shaders and/or fixed function units. The pipeline may be mapped onto specialized computing hardware, such as a GPU, to perform operations such as rendering on graphics data or other data.

Figure 9:
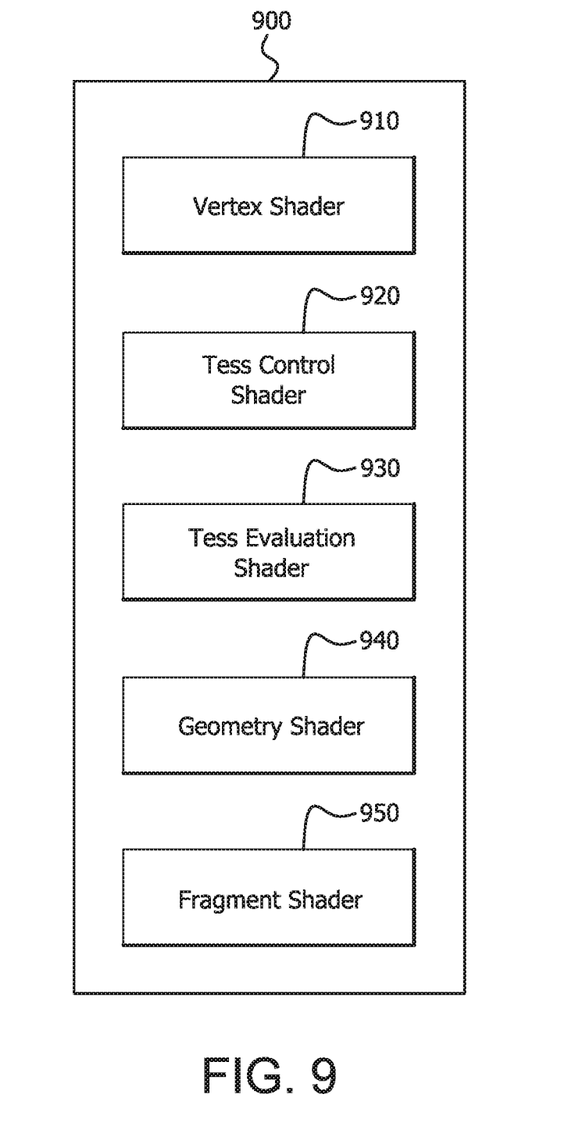
FIG. 9 is a block diagram illustrating an example program object.

FIG. 9 is a block diagram illustrating an example program object 900 for creating a pipeline. In a program object approach to pipeline creation, a pipeline may be implemented by creating an object representing a description of one or more pipeline shaders and binding the object to GPU state.

Program object 900 includes a compiled vertex shader object 910, a compiled tessellation control shader object 920, a compiled tessellation evaluation shader 930, a compiled geometry shader object 940, and a compiled fragment shader object 950. A program executing on a CPU may attach each of the compiled shader objects to the program object 900 by calling a function of a library implementing an API for each shader and passing a reference to one of the compiled shader objects for each call. The compiled shader objects may then be linked together by calling another function of the library to form an executable. The executable may then be bound to GPU state using a further function call. It is noted that other types of shaders or combinations of shaders may be used in other program objects.

When the executable is executed by a GPU, the shaders will input shader resources as discussed further herein. Shader resources for a pipeline created using program object 900 may be specified to the shaders at execution time, or may be specified as a part of the shader source code.

It is also noted that program object 900 does not specify fixed function state, and accordingly a pipeline created using program object 900 may require fixed function state to be specified and validated or cross-validated with the shaders at execution time.

Figure 10:
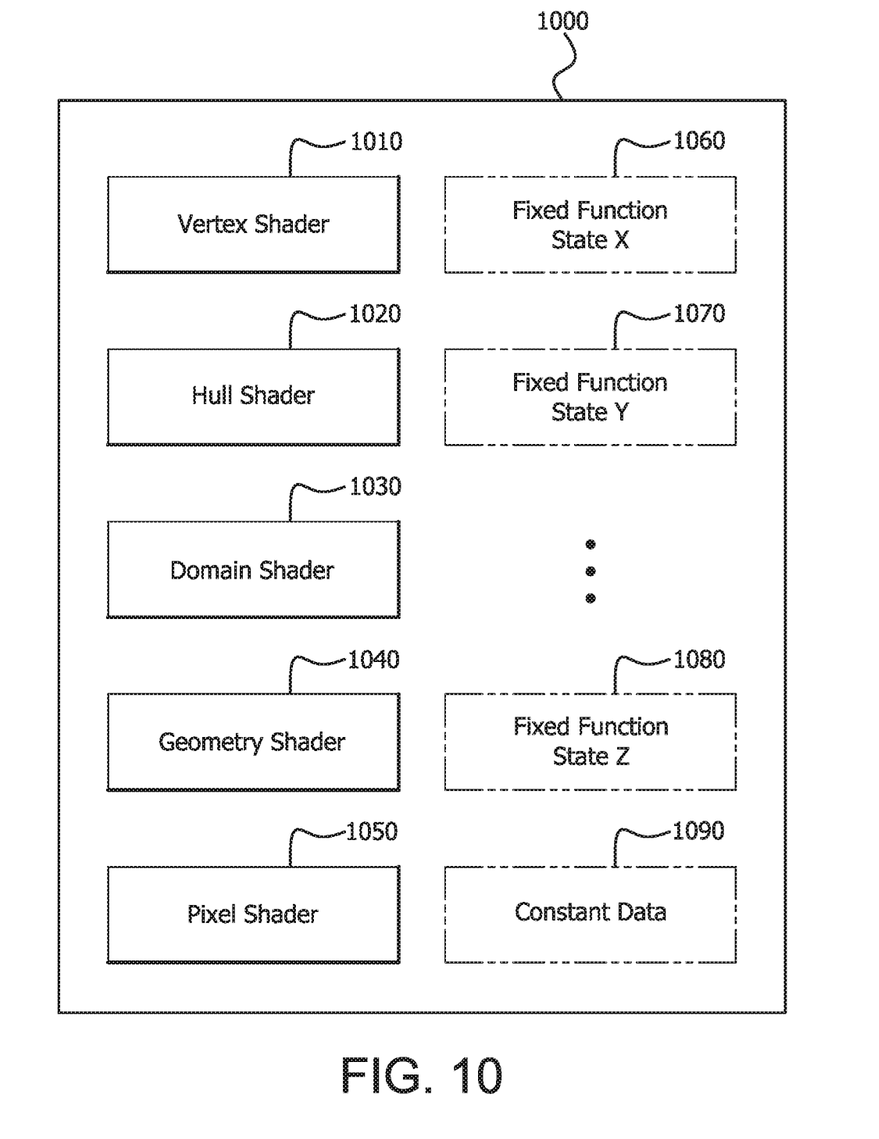
FIG. 10 is a block diagram illustrating an example pipeline object.

FIG. 10 is a block diagram illustrating an example pipeline object 1000 for creating a pipeline. In a pipeline object approach, a pipeline may be implemented on a GPU by creating an object representing a description of one or more pipeline shaders, fixed function state and/or constant data, and binding the object to GPU state.

Pipeline object 1000 includes a compiled vertex shader 1010, a compiled hull shader 1020, a compiled domain shader 1030, a compiled geometry shader 1040, a compiled pixel shader 1050, fixed function state objects 1060, 1070, 1080, and a constant data object 1090. It is noted that different shaders, fixed function state, constant data, or combinations of shaders, fixed function state, constant data may be used in different pipeline objects.

Thus pipeline object 1000 may include all or part of the rendering context for the pipeline. For example, fixed function state objects 1060, 1070, and 1080 may include state information for fixed function stages such as depth buffers, color buffers, rasterization units, or other fixed function modules in a rendering pipeline created using pipeline object 1000. It is noted that a greater or lesser number of fixed function state objects may be used in other pipeline objects. Although fixed function stages may not be considered programmable in the same sense as programmable shaders, a fixed function stage may include settable parameters such as flags or values which can alter its behavior in certain ways or enable and disable the fixed function, and these parameters may be specified using state objects 1060, 1070, and 1080. For example, a color buffer fixed function block may blend results of a pixel shader with a destination image when a parameter or parameters for blending are appropriately configured. The fixed function state objects 1060, 1070, and 1080 may possibly contain only fixed function state which is relevant to compilation of one or more of the shaders.

Pipeline object 1000 also specifies a part of the rendering context using the constant data object 1090, which may include constant data for the compiled shaders. Constant data may include shader state or parameters which affect compilation or operation of one or more of the shaders and may be analogous to the fixed function state provided for fixed function units. It is noted that additional constant data objects may be used in other pipeline objects.

The constant data may be incorporated into the pipeline when pipeline object 1000 is linked. Thus, the constant data may not be required to be pre-compiled with the shader source code, and yet may be provided before shader execution time for constant data known at pipeline creation time. In some circumstances, this may have the advantage of avoiding overhead due to specifying or validating the rendering context during execution, and also may have the advantage of avoiding overhead due to compiling different shaders for different shader uses.

In general, a shader may be validated at compile time to determine whether it will function properly. Validation of the shader may require knowledge of the pipeline context, including constant data for other shaders and context for fixed function units which may have an impact on operation of the shader.

Accordingly, a pipeline constructed using an object which does not include shader and fixed function context, such as program object 900, may require validation to take place at least in part at run time when the context is known. In some circumstances this may decrease performance. A pipeline created using an object which includes shader and fixed function contexts such as pipeline object 1000 may enable validation of all or part of the pipeline at the time the pipeline object is linked. Thus, it may not be necessary to validate compiled shaders at run time because more of the information necessary for validation (i.e., the shader and fixed function contexts) is available for cross-validation of the shader at the time the pipeline is linked.

A pipeline object which includes shader and fixed function contexts may also enable optimization of components of the shader pipeline. Knowledge of the fixed function context for a certain fixed function block may enable a version of a shader to be selected for linking which is optimized for that context. For example, if alpha blending is enabled in the fixed function state, a shader version supporting export of transparency (alpha) values may be required. If alpha blending is not enabled in the fixed function state, the remainder of the pipeline may be analyzed to determine if export of transparency values is required. If these values are not required, a more streamlined or high performance version of the shader may be compiled. This analysis may be propagated through the entire pipeline such that shaders and fixed function state implementing operations bearing on alpha blending may be replaced with more streamlined or higher performance versions which do not include these operations or their associated overhead. Further, shaders within a pipeline can be optimized to propagate dead code elimination from stage to stage based on matching shader outputs to the shader inputs of the subsequent shader stage.

A pipeline object may be created using an API, for example, by calling a function of a library implementing the API, passing details of the desired pipeline such as shaders, fixed function state, and possibly shader resource mapping from one or more descriptor sets to the shaders. The API may return an identifier for the pipeline object which may be bound to the GPU state to implement the pipeline in hardware.

The following pseudocode illustrates example creation and linking of a graphics pipeline "pipe."

```
GRAPHICS_PIPELINE_CREATE_INFO pipeInfo = { };
// Specify shaders
pipeInfo.vs.shader = vertexShader;
pipeInfo.ps.shader = pixelShader;
// Specify relevant fixed function state
pipeInfo.iaState.topology   =TOPOLOGY_TRIANGLE_LIST;
pipeInfo.rsState.depthClipEnable = FALSE;
pipeInfo.cbStatelogicOp = LOGIC_OP_COPY;
pipeInfo.cbState.target[0].channelWriteMask = 0xF;
pipeInfo.cbState.target[0].format.channelFormat = CH_FMT_R8G8B8A8;
pipeInfo.cbState.target[0].format.numericFormat = NUM_FMT_SRGB;
// Specify resource mapping from descriptor set layout to shader entities
pipeInfo.ps.descriptorSetMapping[0].descriptorCount = 3;
pipeInfo.ps.descriptorSetMapping[0].pDescriptorInfo = psRsrcInfo;
pipeInfo.ps.dynamicMemoryViewMapping.slotObjectType =
SLOT_UNUSED;
pipeInfo.vs.dynamicMemoryViewMapping.slotObjectType =
SLOT_SHADER_RESOURCE;
pipeInfo.vs.dynamicMemoryViewMapping.shaderEntityIndex = 0;
// Create pipeline
RESULT result = CreateGraphicsPipeline(device, &pipeInfo, &pipe);
if (result == SUCCESS)
{
   // And after creation query memory requirements and bind memory
   AllocAndBindPipelineMemory(pipe);
}
```

In the above example, a pipeline object "pipeInfo" is populated with specifications for vertex and pixel shaders, various fixed function state parameters, and descriptor set mappings for shader resources. The pipeline object is linked using the "CreateGraphicsPipeline" function call to a library implementing a graphics API.

In this example, the linked pipeline object "pipe" is created without implicitly allocating or binding memory, although implicit allocation of memory by the API may be performed in some implementations. In this example, the memory requirements for "pipe" are queried using another call to the API (not shown). After receiving the memory requirements for "pipe", the code may determine a suitable GPU memory location for "pipe" based on the memory requirements and may bind this memory to GPU state using AllocAndBindPipelineMemory( ). By separating creation, memory allocation, and binding in this way, the linked pipeline "pipe" may be pre-built, and in some implementations GPU memory may be used for other purposes until a point in program execution which requires "pipe" to be bound to the GPU context. In some circumstances, this may have the advantage of enabling memory and compute overhead balancing during program execution.

A pipeline object may also include information relating to shader communication or information matching shader inputs and outputs, and may be constructed using "shader fragments." A shader fragment may be a portion of code such as a library or subroutine which may be combined with another shader fragment or fragments to build a shader. The pipeline object may include a data structure which specifies the data flow among shaders and fixed function objects, and potentially among shader fragments. The data structure which specifies data flow may have an arbitrary structure, and in one example may be a representation of a directed acyclic graph.

It should be understood that many variations are possible based on the disclosure herein. Although features and elements are described above in particular combinations, each feature or element may be used alone without the other features and elements or in various combinations with or without other features and elements.

It is noted that example computer code and pseudocode listings herein are illustrative only, and that the described functionality may be implemented using various other computer languages, structures, and APIs, or may be implemented in hardware where appropriate.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computer processor configured to input a shader resource to a shader or a pipeline, the computer processor comprising:
   circuitry configured to:
   store, in a computer memory, a data structure having at least one slot which contains a pointer to a shader resource stored in a graphics processing unit (GPU) memory;
   bind the data structure to a GPU register;
   reference the at least one slot by an offset to input the shader resource to the shader or pipeline;
   determine a GPU overhead associated with inputting a different shader resource to the shader or pipeline by referencing a different slot of the data structure;

determine a CPU overhead associated with inputting the different shader resource to the shader or pipeline by binding a different data structure to the GPU register; and input the different shader resource to the shader or pipeline, based on the GPU overhead and the CPU overhead, by either referencing a different slot of the data structure or binding a different data structure to the GPU register.

2. The computer processor of claim 1, wherein the data structure includes a plurality of slots, each containing a pointer to a shader resource.

3. The computer processor of claim 1, wherein the data structure is bound to a single bind point.

4. The computer processor of claim 1, wherein the different shader resource is specified by referencing a different slot by a different offset.

5. The computer processor of claim 1, wherein the different shader resource is specified by binding the different data structure and referencing a slot of the different data structure which contains a pointer to the different shader resource.

6. The computer processor of claim 1, wherein the data structure is unbound from the GPU register and the different data structure is bound to the GPU register.

7. The computer processor of claim 1, wherein the different data structure is bound to a different bind point from the data structure.

8. The computer processor of claim 1, wherein the at least one slot contains a pointer to a second data structure having at least one slot containing a pointer to the shader resource.

9. The computer processor of claim 1, wherein the at least one slot contains a pointer to another slot of the data structure which contains a pointer to the shader resource.

10. The computer processor of claim 1, further comprising storing the data structure in a memory.

11. The computer processor of claim 1, further comprising displaying data stored in or pointed to by the data structure on a display.

12. A computer processor configured to input a graphics pipeline resource to a pipeline, the computer processor comprising:
circuitry configured to:
store, in a computer memory, a data structure having at least one slot which contains a pointer to a pipeline resource;
bind the data structure to a GPU register;
reference the at least one slot by an offset to input the graphics pipeline resource to the pipeline;
determine a GPU overhead associated with inputting a different pipeline resource to the pipeline by referencing a different slot of the data structure;
determine a CPU overhead associated with inputting the different pipeline resource to the pipeline by binding a different data structure to the GPU register; and
input the different pipeline resource to the pipeline, based on the GPU overhead and the CPU overhead, by either referencing a different slot of the data structure or binding a different data structure to the GPU register.

13. The computer processor of claim 12, wherein the pipeline resource includes a parameter for a fixed function block, a descriptor for a render target, or both a parameter for a fixed function block, a descriptor for a render target.

14. A computer processing device configured to implement a graphics pipeline, the computer processing device comprising:
circuitry configured to:
store, in a computer memory, a pipeline object and a descriptor set having at least one slot which contains a pointer to a shader resource;
attach at least one shader object to the pipeline object, which specifies at least one shader;
attach at least one rendering context object to the pipeline object which specifies at least part of a rendering context;
bind the descriptor set to a GPU register;
determine a GPU overhead associated with replacing the shader resource by referencing a different slot of the descriptor set;
determine a CPU overhead associated with replacing the shader resource by binding a different descriptor set to the GPU register; and
replace the shader resource, based on the GPU overhead and the CPU overhead, by either referencing a different slot of the descriptor set or binding a different descriptor set to the GPU register.

15. The computer processing device of claim 14, further comprising attaching at least one descriptor set which maps the at least one shader to a shader resource.

16. The computer processing device of claim 14, wherein at least one rendering context objects specifies a fixed function state.

17. The computer processing device of claim 14, wherein at least one rendering context objects specifies constant data.

18. The computer processing device of claim 14, further comprising attaching a data flow object to the pipeline object, which specifies data flow among the at least one shader.

19. The computer processing device of claim 18, wherein the data flow object includes a directed acyclic graph.

20. The computer processing device of claim 14, wherein at least one shader object includes at least one shader fragment.

21. The computer processing device of claim 14, further comprising:
linking the pipeline object; and
validating, cross-validating, or optimizing the pipeline during linking.

22. The computer processing device of claim 21, wherein the validating, cross-validating, or optimizing is performed using the specified rendering context.

* * * * *